US012750657B2

(12) United States Patent
Lahiri et al.

(10) Patent No.: US 12,750,657 B2
(45) Date of Patent: Sep. 29, 2026

(54) SUBSCRIBER DATA MIGRATION WITH DUAL PROVISIONING

(71) Applicant: Cisco Technology, Inc., San Jose, CA (US)

(72) Inventors: Priyabrat Lahiri, Mountain House, CA (US); Parul Anil Kumar Kaushik, Newark, CA (US); Stephan Otto, Thousand Oaks, CA (US); Ummed Singh Malavat, Manteca, CA (US); Karthikeyan Karunanithi, Milpitas, CA (US); Rachit Gupta, Punjab (IN); Omkar Mandavgane, Madhya Pradesh (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 375 days.

(21) Appl. No.: 18/310,797

(22) Filed: May 2, 2023

(65) Prior Publication Data

US 2024/0323674 A1 Sep. 26, 2024

(30) Foreign Application Priority Data

Mar. 21, 2023 (IN) ............................ 202311018947

(51) Int. Cl.
*H04W 8/20* (2009.01)
*H04W 8/02* (2009.01)
*H04W 8/18* (2009.01)

(52) U.S. Cl.
CPC ............... *H04W 8/20* (2013.01); *H04W 8/02* (2013.01); *H04W 8/186* (2013.01)

(58) Field of Classification Search
CPC ......... H04W 12/06; H04W 8/04; H04W 4/50; H04W 8/26; H04W 12/04; H04W 8/18;
(Continued)

(56) References Cited

U.S. PATENT DOCUMENTS 7,013,139 B1 * 3/2006 Gan ........................ H04W 8/30 455/435.1
10,534,795 B2 * 1/2020 Saxena ............... G06F 16/2365
(Continued)

FOREIGN PATENT DOCUMENTS

EP 2051536 A1 4/2009
WO 2009135924 A2 11/2009

*Primary Examiner* — Golam Sorowar
(74) *Attorney, Agent, or Firm* — Edell, Shapiro & Finnan, LLC

(57) ABSTRACT

A method is provided comprising storing, in a first subscriber data server, subscriber data for each of a plurality of wireless devices, the subscriber data enabling wireless communication services for the plurality of wireless devices in a wireless network; determining to migrate the subscriber data from the first subscriber data server to a second subscriber data server; upon determining to migrate the subscriber data, initiating a migration process for the subscriber data from the first subscriber data server to a second subscriber data server by copying the subscriber data from the first subscriber data server to the second subscriber data server; and while copying and one or more new wireless devices are being provisioned for the wireless communication services in the wireless network, adding new subscriber data for the one or more new wireless devices to both the first subscriber data server and to the second subscriber data server.

21 Claims, 11 Drawing Sheets

(58) Field of Classification Search
CPC ....... H04W 12/72; H04W 4/70; H04W 8/183; H04W 4/24; H04W 12/069; H04W 12/08; H04W 60/00; H04W 4/60; H04W 8/06; H04W 4/029; H04W 88/02; H04W 8/20; H04W 12/088; H04W 60/04; H04W 12/35; H04W 8/186; H04W 12/062; H04W 12/45; H04L 2101/654; H04L 61/4588; H04L 67/10; H04L 63/0853; H04L 67/306; H04L 63/10; H04L 61/5076; H04L 63/08; H04L 63/0876; H04L 65/1016; H04L 43/00; H04L 43/16; H04L 67/535; H04L 12/1485; H04L 41/0816
See application file for complete search history.

(56) References Cited

U.S. PATENT DOCUMENTS

| | | | | |
|---|---|---|---|---|
| 10,592,484 | B1 * | 3/2020 | Sharma | G06F 16/2343 |
| 11,144,517 | B2 * | 10/2021 | Nadimpalli | G06F 3/0647 |
| 2005/0020259 | A1 | 1/2005 | Herrero | |
| 2005/0083862 | A1 | 4/2005 | Kongalath | |
| 2006/0246894 | A1 | 11/2006 | Meng | |
| 2013/0212284 | A1 * | 8/2013 | Milinski | H04L 65/1073 709/226 |
| 2019/0387065 | A1 * | 12/2019 | Lau | G06F 16/162 |
| 2020/0409914 | A1 * | 12/2020 | Nadimpalli | G06F 16/214 |
| 2024/0330253 | A1 * | 10/2024 | Dubey | G06F 16/214 |
| 2025/0142317 | A1 * | 5/2025 | Sharma | H04W 8/18 |

* cited by examiner

SUBSCRIBER DATA MIGRATION WITH DUAL PROVISIONING

PRIORITY CLAIM

This application claims priority to Indian Patent Application No. 202311018947, filed Mar. 21, 2023, the entirety of which is incorporated by reference.

TECHNICAL FIELD

The present disclosure relates to migrating subscriber data of Internet of Things (IoT) devices.

BACKGROUND

Subscriber Identity Module (SIM) (subscriber) data is an important piece of data used to manage wireless services to wireless subscriber devices, such as IoT devices. An IoT control center (CC) enables connecting to, provisioning, and deploying devices at scale quickly and accurately.

Keeping the subscriber data in sync between the IoT control center and a Home Location Register/Home Subscriber Server (HLR/HSS) is used to maintain wireless wide area network (WWAN) service to IoT devices. Occasionally, there is a need to migrate subscriber data from one hosted HLR/HSS to another hosted HLR/HSS for capacity management, technology upgrade, or to a customer hosted HLR/HSS if the customer wants to manage the subscriber data in their core network.

DESCRIPTION OF EXAMPLE EMBODIMENTS

Overview

Presented herein are techniques to reliably and efficiently migrate subscriber data to a new HLR/HSS with minimal provisioning downtime or impact. A computer-implemented method is provided that comprises storing, in a first subscriber data server, subscriber data for each of a plurality of wireless devices, the subscriber data enabling wireless communication services for the plurality of wireless devices in a wireless network; determining to migrate the subscriber data from the first subscriber data server to a second subscriber data server; upon determining to migrate the subscriber data, initiating a migration process to migrate the subscriber data from the first subscriber data server to a second subscriber data server by copying the subscriber data from the first subscriber data server to the second subscriber data server; and while copying is occurring and one or more new wireless devices are being provisioned for the wireless communication services in the wireless network, adding new subscriber data for the one or more new wireless devices to both the first subscriber data server and to the second subscriber data server.

Example Embodiments

Figure 1A:
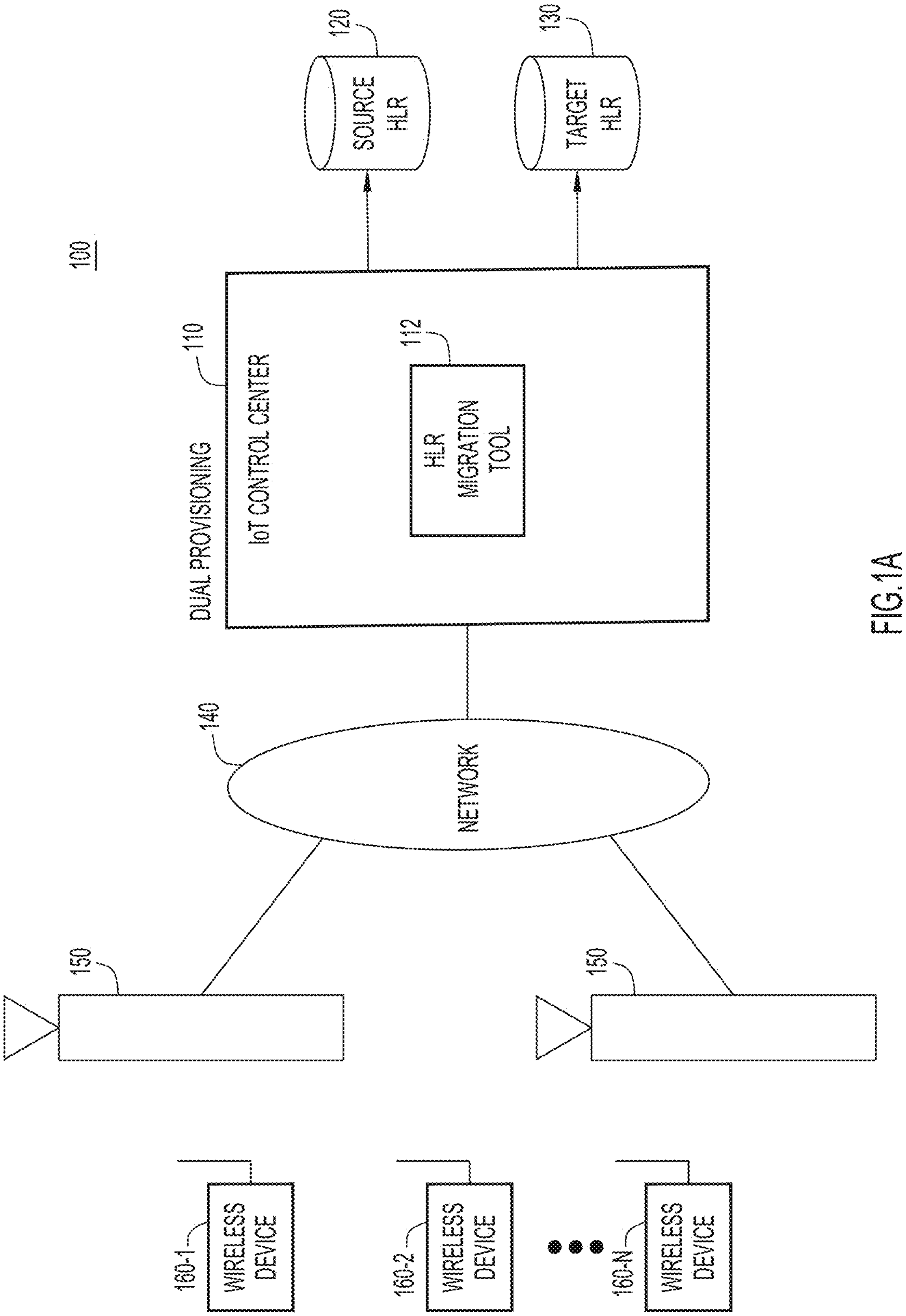
FIG. 1A is a system block diagram of a system that includes an IoT control center that includes an HLR migration tool to facilitate migration of subscriber data from a source HLR to a target HLR, according to an example embodiment.

Referring first to FIG. 1A, a block diagram is shown of a system 100 that includes an IoT control center (CC) 110 that includes HLR migration tool 112 to facilitate migration of subscriber data from a first subscriber data server ("source HLR") 120 to a second subscriber data server ("target HLR") 130. The IoT CC 110 has network connectivity, via network (e.g., Internet) 140, to base stations 150, which in turn provide wireless communication services in one or more wireless networks (e.g., 3GPP wireless networks) for wireless devices 160-1, 160-2, . . . , 160-N. The wireless devices 160-1 to 160-N may be referred to subscriber devices or IoT devices.

Figure 1B:
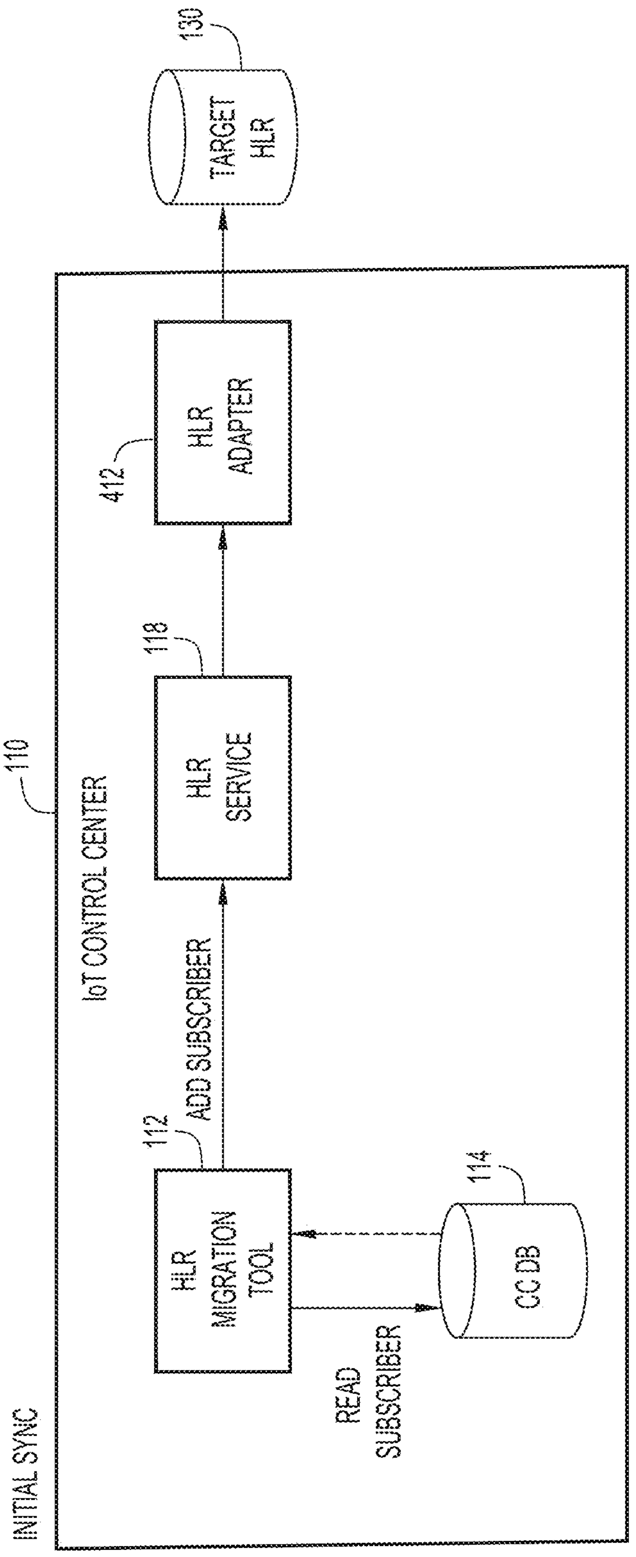
FIG. 1B is a high-level block diagram of a system undergoing initial sync in HLR migration process, according to an example embodiment.

Reference is now made to FIG. 1B, which shows the IoT CC 110 in more detail. The IoT CC 110 includes the HLR migration tool 112, a CC database (DB) 114, an HLR service 116 and an HLR adapter function 118. There is the target HLR 130 to which the subscriber data is to migrated by the HLR migration tool 112.

Figure 2:
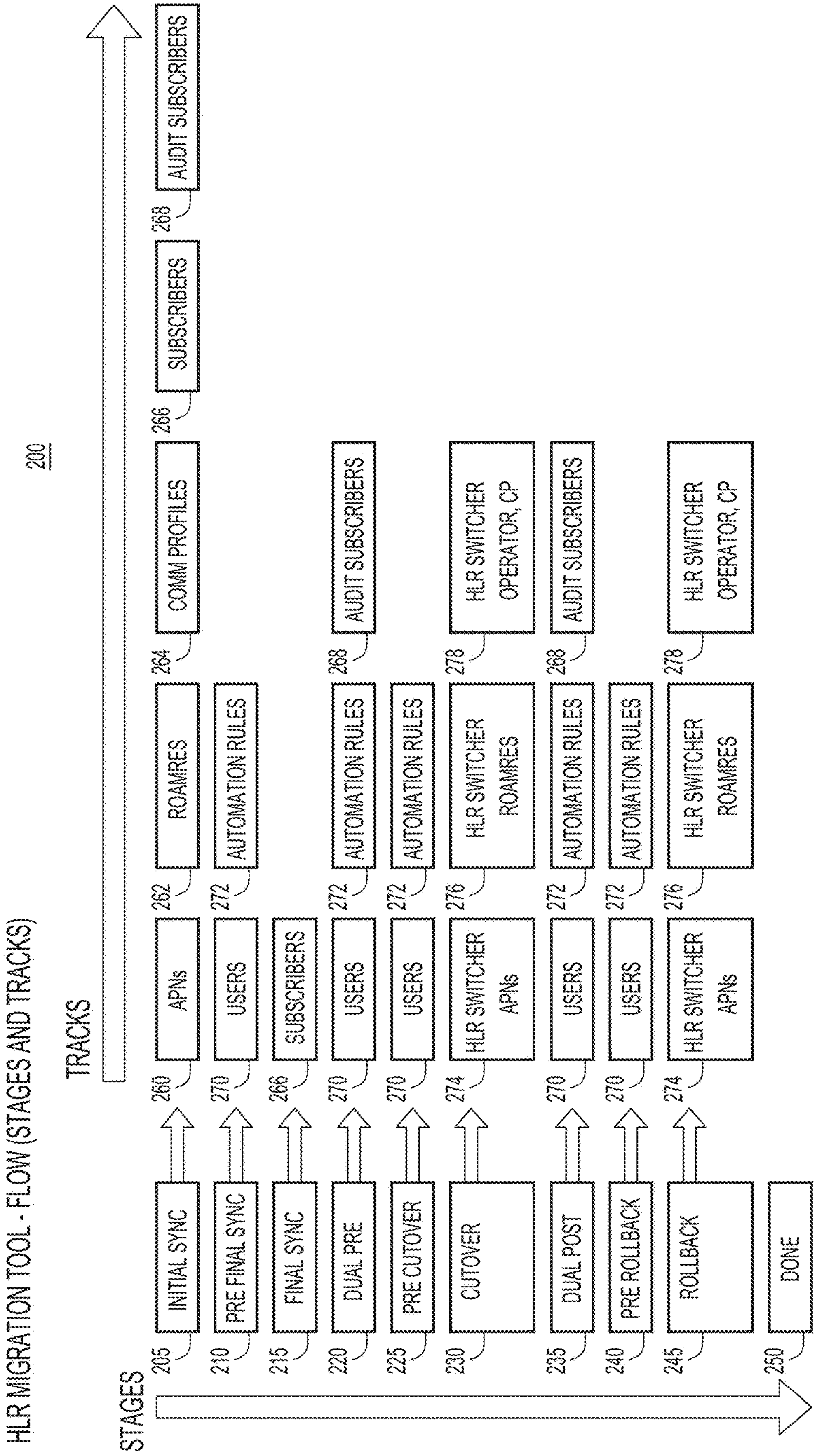
FIG. 2 is a flow chart illustrating the various stages of the HLR migration process, according to an example embodiment.

FIG. 2 shows the various stages 200 of the migration process performed by the HLR migration tool 112. Those stages are as follows.

INITIAL SYNC stage 205

PRE FINAL SYNC stage 210

FINAL SYNC stage 215

DUAL PROVISIONING PRE stage 220

PRE CUTOVER stage 225

CUTOVER stage 230

DUAL PROVISIONING POST stage 235

PRE ROLLBACK stage 240

ROLLBACK stage 245

DONE stage 250

Also as shown in FIG. 2, each stage will run one or more processing tracks. The different processing tracks are:

APNS at reference numeral 260: Access Point Names—Name of a gateway between a mobile network and the Internet.

ROAMRES at reference numeral 262: Roaming Restriction—Each communication profile is associated with a set of approved wireless communication service providers (also called "carriers") that can provide network services to the devices on the communication plan. The IoT CC uses roaming restriction set identifiers (IDs) to map carriers with communication profiles. Different networks require different roaming restrictions.

COMMPROFILES at reference numeral 264: Communication Profiles—A communication profile is a template that determines which services are available to a device, and which carriers the device can use when roaming. The communication profile also defines the available data service identifiers:

UMTS APNs for devices using the GPRS network

LTE APNs for device using the LTE network

SUBSCRIBERS at reference numeral 266: A SIM is a physical card within a device that enables the device to communicate wirelessly. Subscribers are the SIM related data that is first uploaded in IoT Control Center and then provisioned in the HLR/HSS.

AUDIT SUBSCRIBERS at reference numeral 268: This is a process to compare the subscriber (SIM) data provisioned in the HLR against the subscriber data stored in IoT Control Center and report if there are any discrepancies.

USERS at reference numeral 270: Customers who can log in to the IoT Control Center and add, update or delete a SIM which will be reflected on HLR/HSS.

AUTOMATION_RULES at reference numeral 272: Automation rules enable customers to ensure service reliability, manage costs, and scale their business faster by programmatically controlling their devices—without doing any programming. They can quickly and easily set custom rules right from the Control Center user interface, instructing the platform to monitor their devices and, if a specific triggers occurs, take appropriate action instantly and automatically.

HLR_SWITCHER_APNS at reference numeral 274: Before the cutover to target HLR, APNS data is associated with source HLR. HLR_SWITCHER_APNS is a track in the cutover stage which will associate the APNS data with target HLR HLR_SWITCHER_ROAMRES at reference numeral 276: Before the cutover to target HLR, Roaming Restriction data is associated with the source HLR. HLR_SWITCHER_ROAMRES is a track in cutover stage that will associate the Roaming Restriction data with the target HLR.

HLR_SWITCHER_OPERATOR_COMMPLAN_COMMPROFILE (CP) at reference numeral 278: Before the cutover to target HLR, Operator (Service Provider), Communication Plan and Communication Profile data are associated with source HLR.

HLR_SWITCHER_COMMPLAN_COMMPROFILE is a track in the cutover stage that will associate this data with the target HLR The HLR migration tool 112 also performs an HLR audit which verifies consistency between IoT Control Center DB 114 and the target HLR 130.

Each stage of the migration process is now described in more detail below.

Initial Sync

Figure 3:
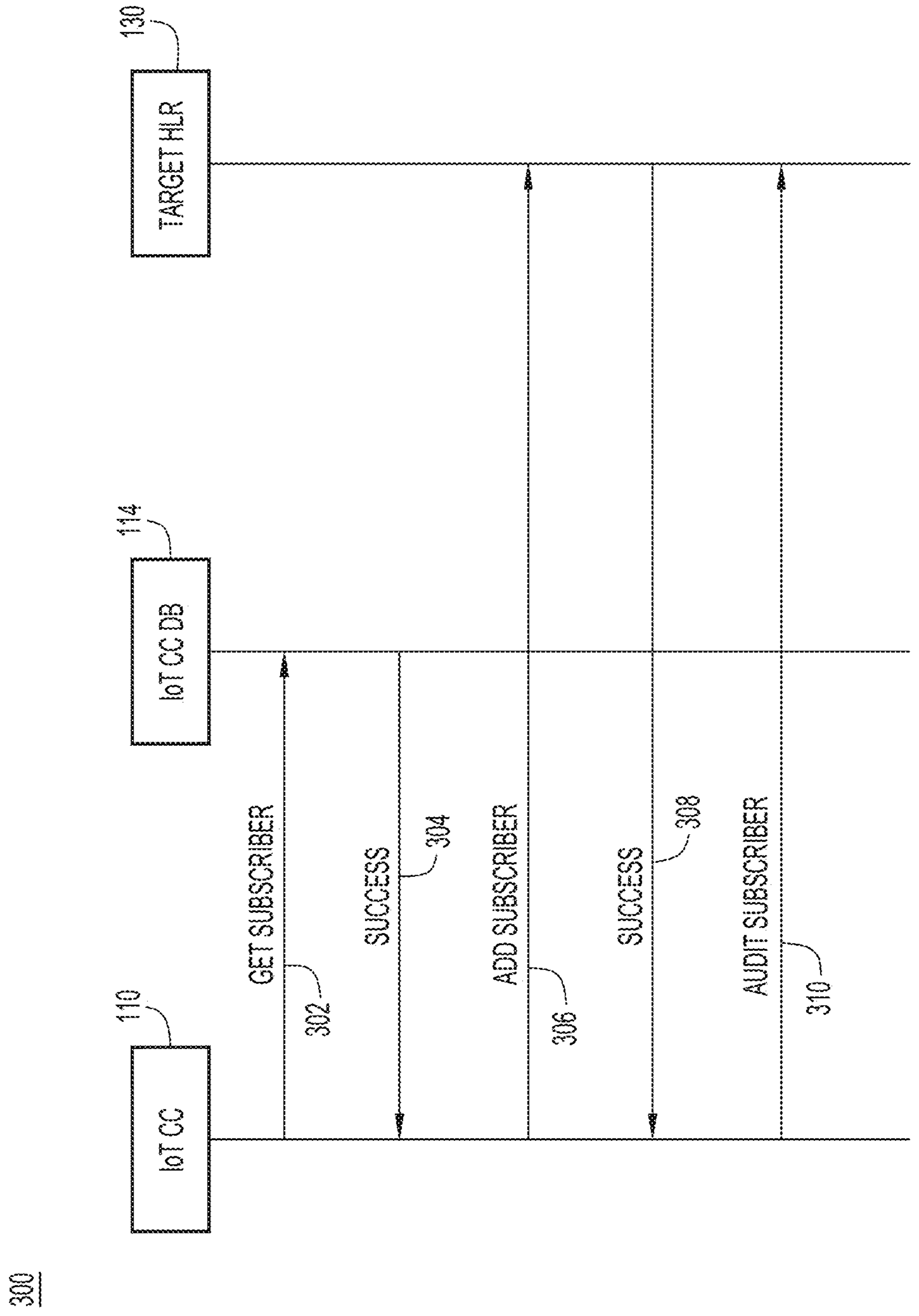
FIG. 3 illustrates a sequence diagram of the initial sync stage of the migration process, according to an example embodiment.

With reference to FIGS. 1B, 2 and 3, operation of the Initial Sync stage 205 is now described. In this stage, data is synchronized between source HLR and the target HLR. This stage supports 5 tracks. The operational flow is shown at 300.

APNS—audit to ensure APNS on the source HLR and the target HLR are the same.

RoamRes—audit to ensure ROAMRES on the source HLR and the target HLR are the same.

CommProfiles—add templates present on the source HLR to the target HLR. This will be added only when the exact same template is not present on the target HLR.

Subscribers—add, update or delete subscribers present on the source HLR to the target HLR. If while running this track, more SIMs get loaded to the source HLR, the new subscribers will also get added to the target HLR. This is shown at steps 302 and 304. At steps 306 and 308, a subscriber is added to the target HLR.

Audit Subscribers—to ensure the target HLR is provisioned correctly. An HLR reconciliation tool is used to verify that each subscriber exists in correct state on the target HLR. Thus, at step 310, the target HLR is audited for each subscriber for which it stores subscriber data.

Only after all the 5 tracks are completed in sequence does the migration process goes to the next stage. If any track has failed, this stage is rerun and the track which has failed will be processed again.

Pre Final Sync

The Pre Final Sync stage 210 is performed just before starting the Dual Provisioning Pre stage 220. A maintenance window is used for this stage. This stage has two tracks:

Users—disable user logins

Automation Rules—disable automation rules.

Final Sync

The Final Sync stage 215 is performed during the maintenance window to attain parity between source HLR and target HLR in this stage. This stage may have one track:

Subscribers—add/update or delete subscribers present on the source HLR on the target HLR. This sync may be incremental and relatively fast.

Dual Provisioning

Figure 4:
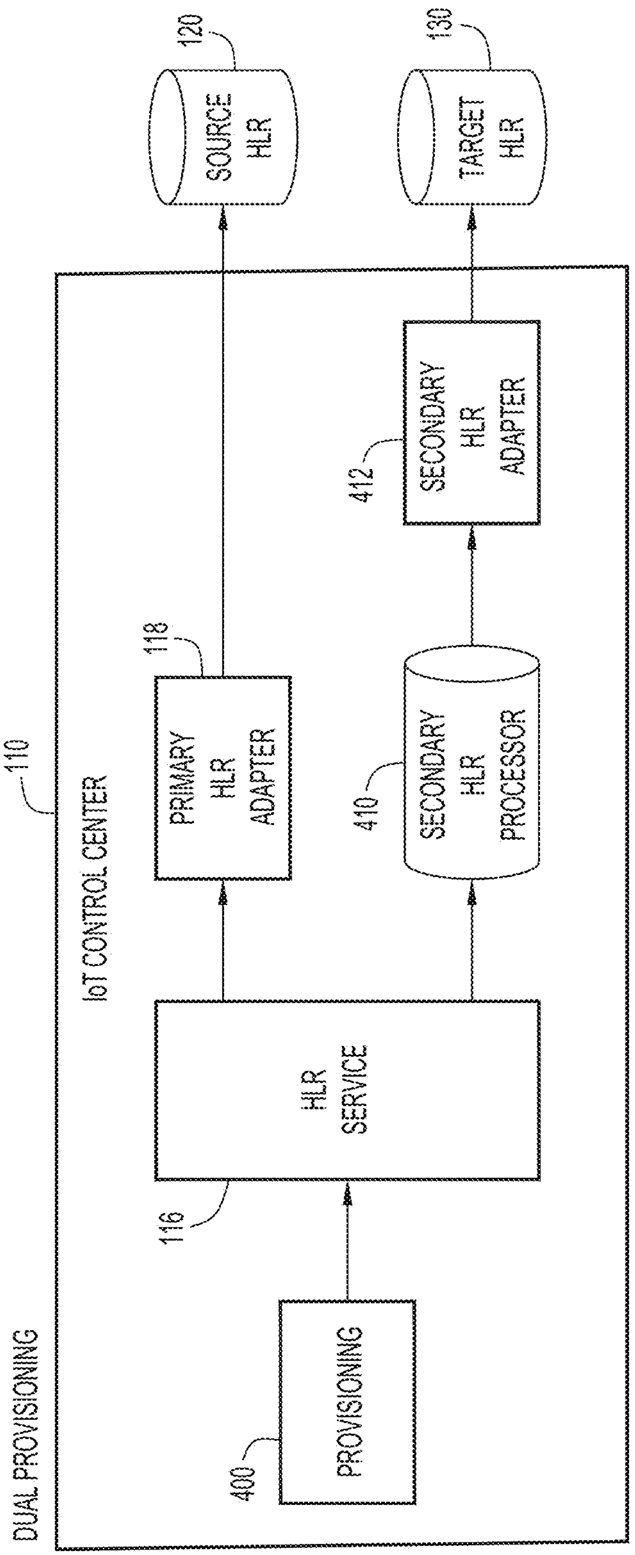
FIG. 4 is a block diagram depicting the dual provisioning features of the HLR migration process, according to an example embodiment.
Figure 5:
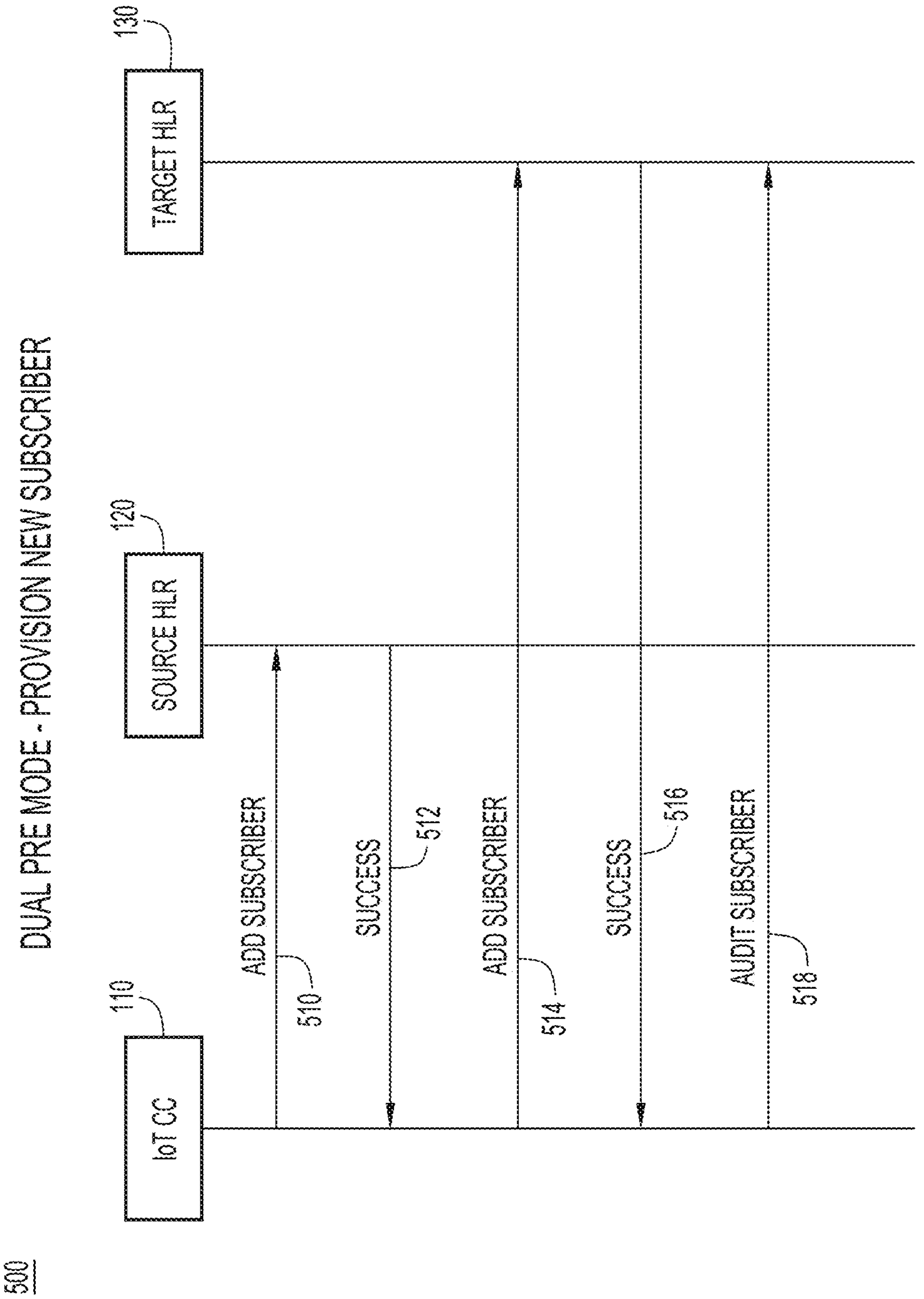
FIGS. 5 and 6 illustrate sequence diagrams of the dual provisioning pre stage, according to an example embodiment.
Figure 6:
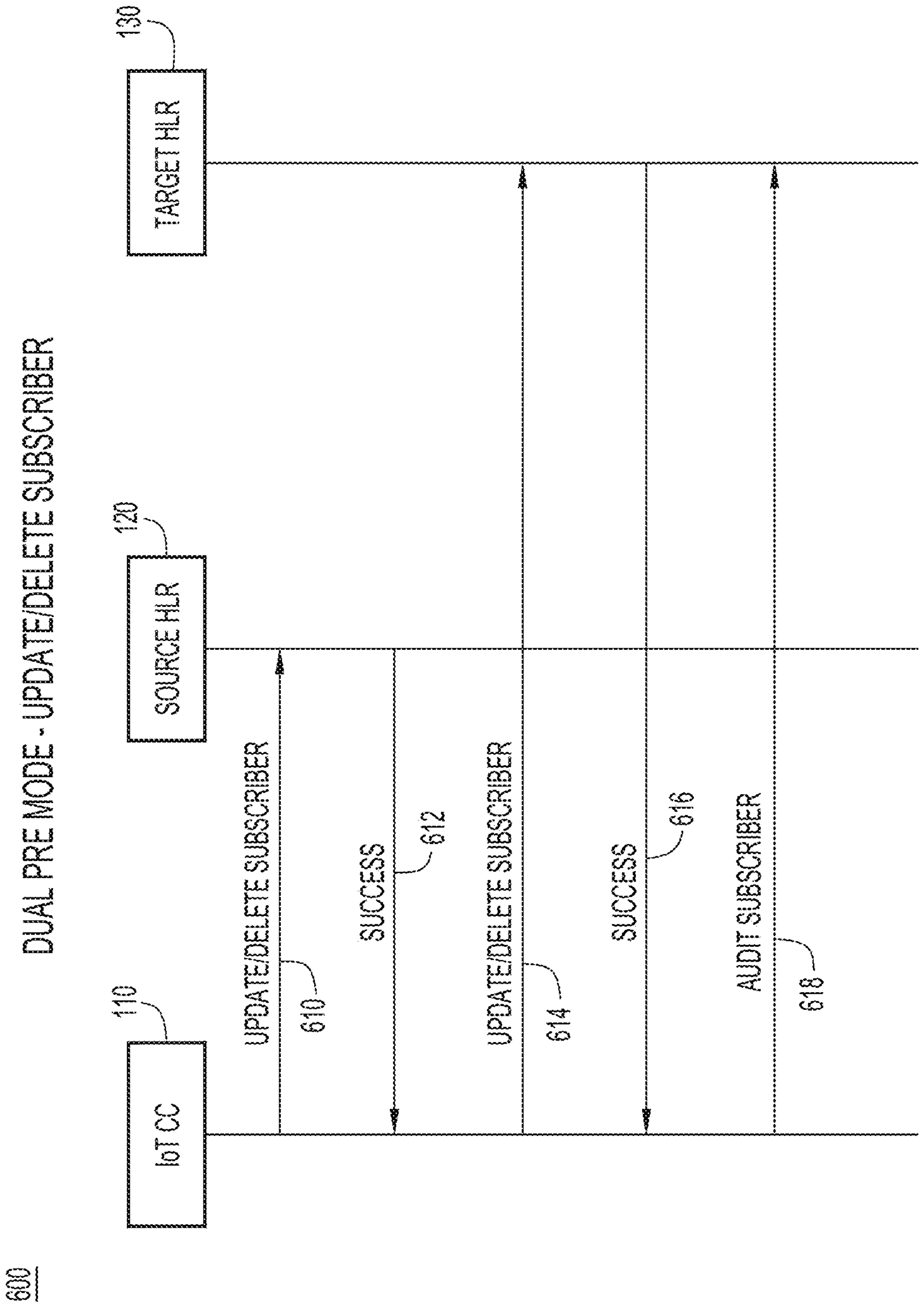

Reference is now made to FIGS. 4-6 for a description of the Dual Provisioning aspects of the HLR migration process. In Dual Provisioning both the source HLR and the target HLR are provisioned to keep the subscriber data in sync. This is done after initial subscriber data copy is completed.

First, as shown in FIG. 4, provisioning, shown at 400, is performed for any new subscribers. The HLR service 116 forwards the subscriber data for newly added subscribers along two paths. A first path is via the HLR adapter function 118 to the source HLR 120. A second path is via a secondary HLR processor 410 and secondary HLR adapter 412 to the target HLR 130. Thus, this provides confidence that the target HLR 130 can support provisioning activity once it becomes the primary HLR. If for any reason it is desired not to proceed with migration, the migration can be stopped and there will be no service impact because subscriber data is present on both the source HLR 120 and target HLR 130. Also if after cutover, the target HLR 130 encounters issues and is unable to handle provisioning, rollback can be achieved seamlessly as data was in sync between source HLR 120 and target HLR 130.

Dual Provisioning Pre

Reference is made to FIGS. 5 and 6 for a more detailed description of the Dual Provisioning Pre stage.

This stage has three tracks:

Users—enable user logins

Automation Rules—enable automation rules.

Maintenance Window is closed after completion of this stage.

As part of this stage, both source HLR/HSS and target HLR/HSS are provisioned, as shown by the operational flow 500 in FIG. 5. The target HLR/HSS is provisioned only after successful provisioning on source HLR/HSS. At 510 and 512, the IoT CC adds a new subscriber to the source HLR 120, At 514 and 516, the IoT CC adds the new subscriber (the same one added to the source HLR 12) to the target HLR 130. At 518, the audit subscriber operation is performed to make sure the target HLR 130 is provisioned correctly. The HLR migration Tool also performs an HLR audit which verifies consistency between the IoT CC DB and the target HLR 130.

While in the dual provisioning pre stage if more SIMs (subscriber data) are loaded on the source HLR 120, an update is made of the number of details of audit subscriber track and also the newly added subscribers. If there are errors reported by the audit subscribers track, the failed track detail can be used to fix the error by comparing the subscriber data between IoT CC DB and target HLR 130.

FIG. 6 shows an operational flow 600 for updating or deleting a subscriber. At 610 and 612, the IoT CC 110 performs an update/delete of a subscriber at the source HLR 120. Similarly, at 614 and 616, the IoT CC 110 performs an update/delete of a subscriber at the target HLR 130. At 618, the audit subscriber operation is performed on the target HLR 130.

Pre Cutover

This stage happens just before cutover. A maintenance window is used for this stage. This stage has two tracks:

Users—disable user logins

Automation Rules—disable automation rules.

Warnings may be added to make the administrator aware that the audit track has errors and administrator can decide if they want to continue to the next stage.

Cutover

This stage can be entered only after signaling cutover is completed successfully. The IoT CC entities are updated with the target HLR in this stage. This stage may have three tracks.

The number of details in the list page will be zero.

HLR_Switcher_APNs: update the HLR identifier (hlrId or HLR Id) to the target HLR Id for APNs HLR_Switcher_RoamRes: update the hlrId to target HLR Id for RoamRes HLR_Switcher_Operator_commplan_commprofiles: update the hlrId to target HLR Id for operator, commplans and commprofiles.

Dual Provisioning Post

In this stage the operator HLR has been migrated and the operator HLR is the primary HLR.

This stage has two tracks:

Users—enable user logins

Automation Rules—enable automation rules.

Maintenance window will be closed after completion of this stage.

As part of this stage both source HLR and target HLR are provisioned. The source HLR is provisioned only after successful provisioning on the target HLR.

This stage will have one track:

Audit Subscribers—to make sure target HLR is provisioned correctly. The HLR migration Tool also performs an HLR audit which verifies consistency between IoT CC DB and the target HLR.

Figure 7:
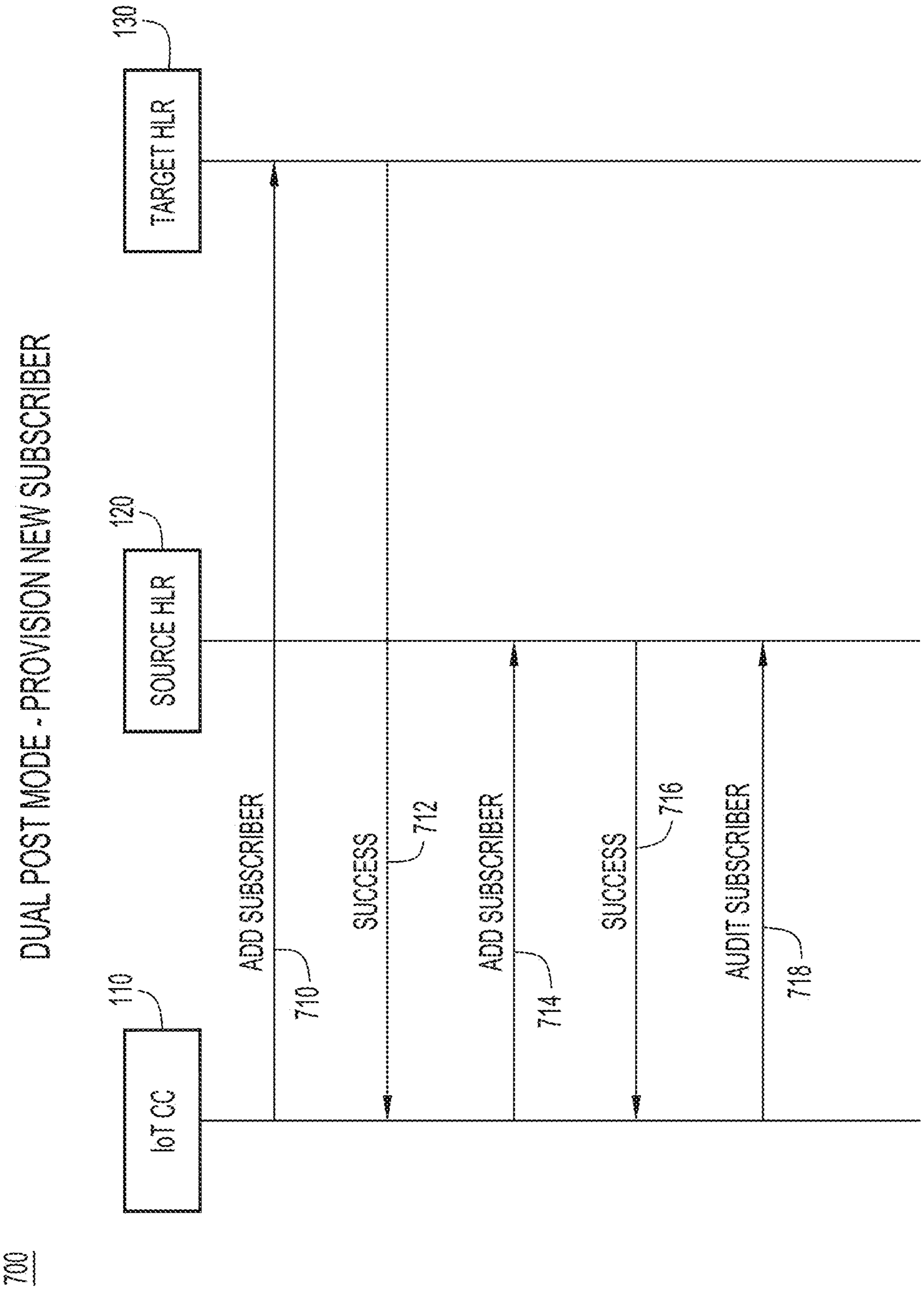
FIGS. 7 and 8 illustrate sequence diagrams of the dual provisioning post stage, according to an example embodiment.

FIG. 7 illustrates an operational flow 700 for provisioning a new subscriber in this mode. At 710 and 712, a new subscriber is added to the target HLR. At 714 and 716, the new subscriber is added to the source HLR 120. At 718, the source HLR is audited.

While in dual provisioning post stage if more SIMs are loaded on the source HLR 120, an update is made of the number of details of audit subscriber track and also the newly added subscribers are processed.

If there are errors reported by the audit subscribers track, can find more details using the failed track detail and fix the error using the HLR Reconciliation tool.

Figure 8:
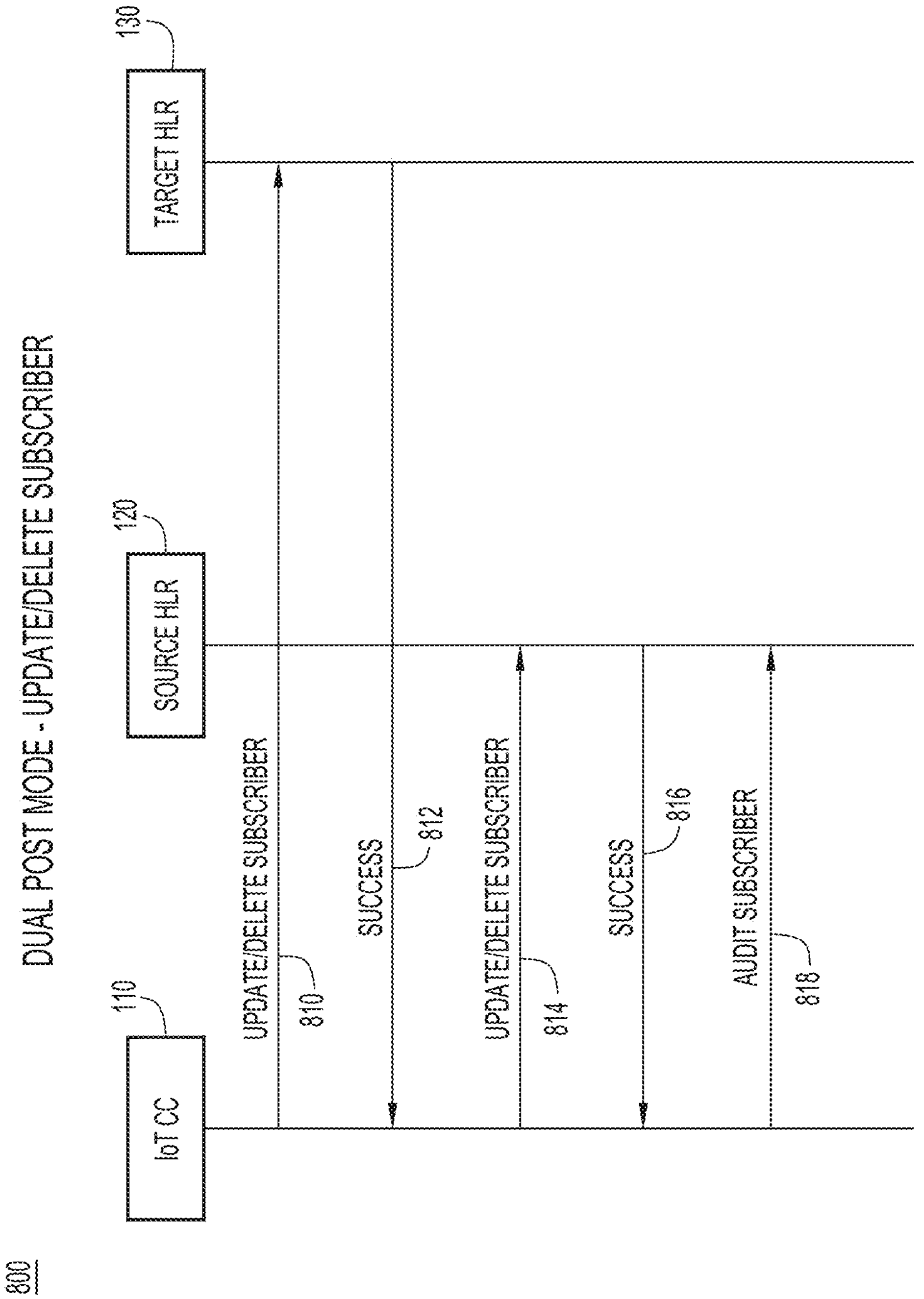

Thus, as shown in FIG. 8, there is an operational flow 800 in this stage to update or delete a subscriber. At 810 and 812, a subscriber in the target HLR 130 is updated or deleted. At 814 and 816, the subscriber is also updated or deleted in the source HLR 120. At 818, an audit is run on the source HLR 120.

Done

Once the service provider is stable on its own HLR, the DONE stage is entered and migration will be marked as completed.

The dual provisioning track is now disabled.

Pre Rollback

If rollback is to be performed after cutover or after dual provisioning post has been done, this stage is entered. A maintenance window is needed for this stage. This stage will have two tracks:

Users—disable user logins

Automation Rules—disable automation rules.

Rollback

This is the reverse of cutover.

This stage is entered only after the network has been rolled back successfully. Control center entities are updated with source HLR in this stage. This stage will have three tracks, these tracks do not have any corresponding track details.

HLR_Switcher_APNs: update the hlrId to source HLR Id for APNs

HLR_Switcher_RoamRes: update the hlrId to source HLR Id for RoamRes

HLR_Switcher_Operator_commplan_commprofiles: update the hlrId to source HLR Id for operator, commplans and commprofiles.

The HLR/HSS migration tool is designed to migrate subscriber data from any source HLR/HSS to any target HLR/HSS. By completing the different stages of migration successfully it can be ensured the data has been migrated correctly to the target HLR/HSS.

The entire process is transparent to customers and they do not experience any impact on subscriber provisioning when migration activity is in progress. This is possible due to dual provisioning between source and target HLR/HSS.

The migration tool provides a very robust audit and reconciliation process at different stages of migration which ensures that subscriber data migrated to target HLR/HSS is in sync the IoT CC. This feature combined with dual provisioning significantly reduces the cutover MW time.

The migration process supports multi HLR/HSS migration. This enables migration of subscriber data that is spread across three different HLR/HSS.

The migration process also supports International Mobile Subscriber Identity (IMSI) range-based migration. For a given operator, the IMSI ranges to be migrated can be selected. This is useful to avoid network surge that can occur while performing signaling cutover of a customer which has a very large amount of subscriber data.

The HLR migration process provides the ability to pause and unpause the migration activity at any stage of the migration. If any issue during migration is encountered, it is possible to go back to previous stages or even rollback the HLR/HSS migration.

Figure 9:
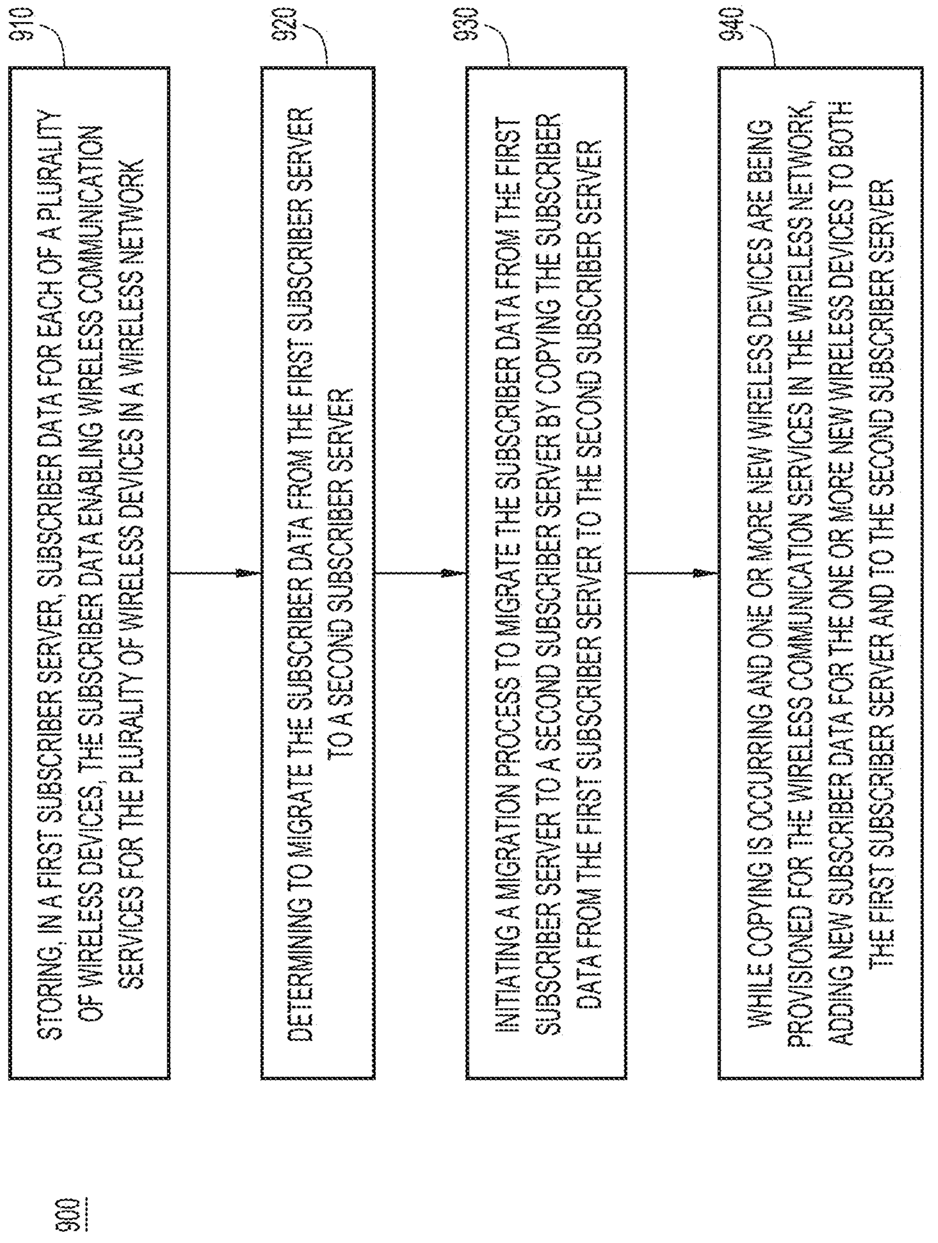
FIG. 9 is a flow chart depicting an HLR migration process according to an example embodiment.

FIG. 9 illustrates a flow chart depicting, at a high-level, an HLR migration process 900 employing the concepts described above in connection with FIGS. 1A, 1B and 2-8. At step 910, the process 900 includes storing, in a first subscriber server, subscriber data for each of a plurality of wireless devices, the subscriber data enabling wireless communication services for the plurality of wireless devices in a wireless network. At step 920, the process 900 includes determining to migrate the subscriber data from the first subscriber server to a second subscriber server. At step 930, the process 900 includes, upon determining to migrate the subscriber data, initiating a migration process to migrate the subscriber data from the first subscriber server to a second subscriber server by copying the subscriber data from the first subscriber server to the second subscriber server. Lastly, the process 900 includes, at step 940, while copying is occurring and one or more new wireless devices are being provisioned for the wireless communication services in the wireless network, adding new subscriber data for the one or more new wireless devices to both the first subscriber server and to the second subscriber server.

Figure 10:
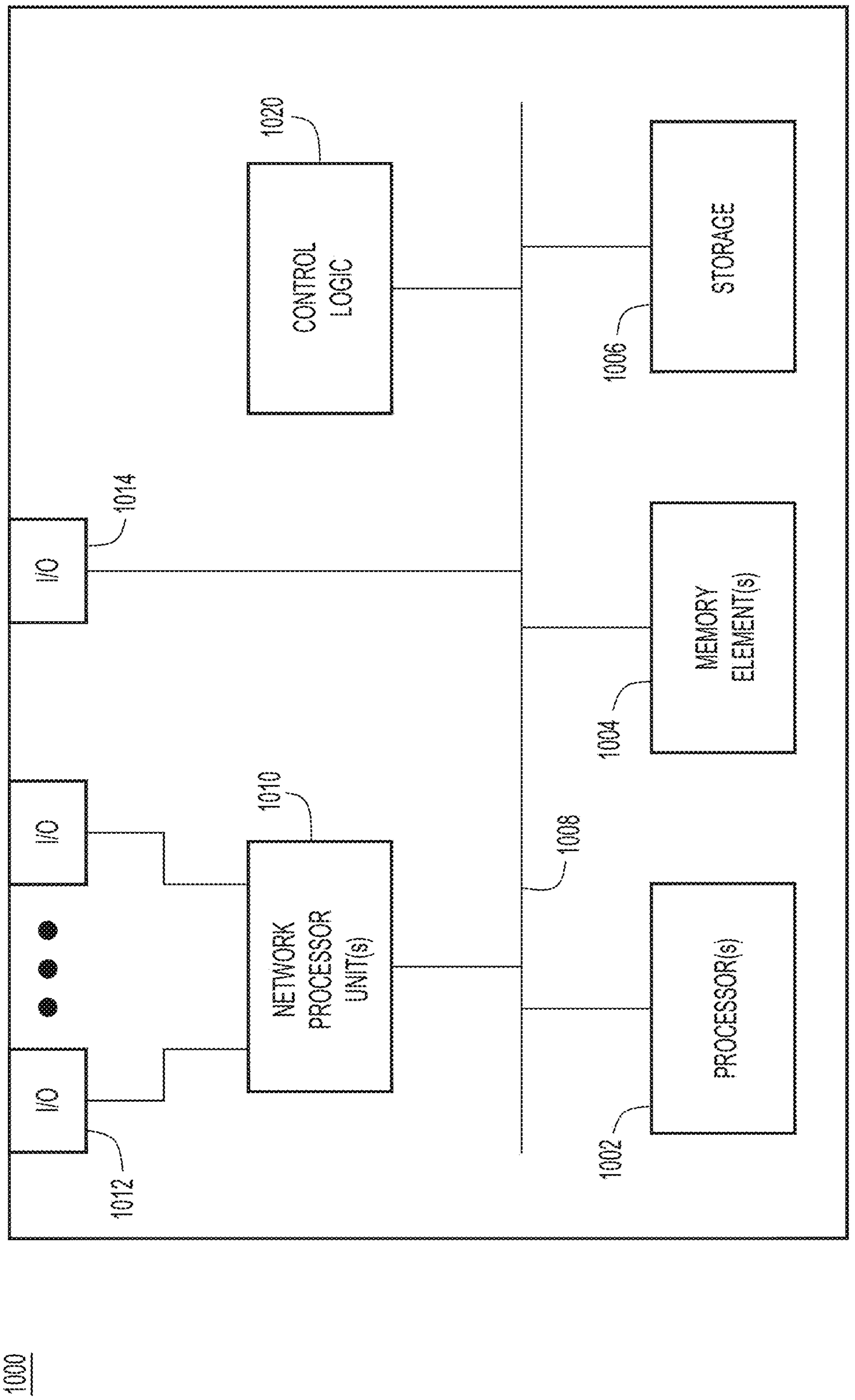
FIG. 10 illustrates a hardware block diagram of a computing device that may perform functions associated with operations discussed herein in connection with the techniques depicted in FIGS. 1-9.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device or apparatus, such as computing device 1000 or any combination of computing devices 1000, may be configured as any entity/entities as discussed for the techniques depicted in connection with FIGS. 1-8 in order to perform operations of the various techniques discussed herein.

In at least one embodiment, the computing device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a computer-implemented method including: storing, in a first subscriber data server, subscriber data for each of a plurality of wireless devices, the subscriber data enabling wireless communication services for the plurality of wireless devices in a wireless network; determining to migrate the subscriber data from the first subscriber data server to a second subscriber data server; upon determining to migrate the subscriber data, initiating a migration process to migrate the subscriber data from the first subscriber data server to a second subscriber data server by copying the subscriber data from the first subscriber data server to the second subscriber data server; and while copying is occurring and one or more new wireless devices are being provisioned for the wireless communication services in the wireless network, adding new subscriber data for the one or more new wireless devices to both the first subscriber data server and to the second subscriber data server.

In some aspects, the techniques described herein relate to a method, wherein adding includes continuing to provision the new subscriber data in both the first subscriber data server and to the second subscriber data server after signaling cutover to the second subscriber data server for a period of time after has occurred until it is determined that there is no need to roll back to the first subscriber data server.

In some aspects, the techniques described herein relate to a method, wherein the migration process includes a plurality of stages, each of which includes one or more processing tracks.

In some aspects, the techniques described herein relate to a method, further including: pausing the migration process at a particular stage of the plurality of stages upon determining occurrence of an issue that would prevent accurate migration of the subscriber data; and upon resolution of the issue, resuming the migration process from the particular stage.

In some aspects, the techniques described herein relate to a method, further including: auditing the subscriber data in the first subscriber data server and the second subscriber data server at one or more of the plurality of stages to verify that the subscriber data is in sync at the first subscriber data server and the second subscriber data server.

In some aspects, the techniques described herein relate to a method, further including: when it is determined that cutover is to be made to the second subscriber data server, moving live traffic data from the first subscriber data server to the second subscriber data server.

In some aspects, the techniques described herein relate to a method, wherein the one or more processing tracks include: a communication profile data including a template that determines which wireless communication services are available to a given wireless device of the plurality of wireless devices, and which wireless communication service providers the given wireless device can use when roaming; roaming restriction data that maps wireless communication service providers with respective communication profiles: switchover access point name data for gateways between the wireless network and the Internet to be associated with the second subscriber data server; switchover roaming restriction data that associates the roaming restriction data with the second subscriber data server; and switchover communication profile data that associates the communication profile data with the second subscriber data server.

In some aspects, the techniques described herein relate to one or more non-transitory computer readable storage media encoded with instructions that, when executed by one or more processors, cause the one or more processors to perform a method including operations including: storing, in a first subscriber data server, subscriber data for each of a plurality of wireless devices, the subscriber data enabling wireless communication services for the plurality of wireless devices in a wireless network; determining to migrate the subscriber data from the first subscriber data server to a second subscriber data server; upon determining to migrate the subscriber data, initiating a migration process to migrate the subscriber data from the first subscriber data server to a second subscriber data server by copying the subscriber data from the first subscriber data server to the second subscriber data server; and while copying is occurring and one or more new wireless devices are being provisioned for the wireless communication services in the wireless network, adding new subscriber data for the one or more new wireless devices to both the first subscriber data server and to the second subscriber data server.

In some aspects, the techniques described herein relate to one or more non-transitory computer readable storage media, wherein adding includes continuing to provision the new subscriber data in both the first subscriber data server and to the second subscriber data server after signaling cutover to the second subscriber data server for a period of time after has occurred until it is determined that there is no need to roll back to the first subscriber data server.

In some aspects, the techniques described herein relate to one or more non-transitory computer readable storage media, wherein the migration process includes a plurality of stages, each of which includes one or more processing tracks.

In some aspects, the techniques described herein relate to one or more non-transitory computer readable storage media, wherein the method further includes operations of: pausing the migration process at a particular stage of the plurality of stages upon determining occurrence of an issue that would prevent accurate migration of the subscriber data; and upon resolution of the issue, resuming the migration process from the particular stage.

In some aspects, the techniques described herein relate to one or more non-transitory computer readable storage media, wherein the method further includes: auditing the subscriber data in the first subscriber data server and the second subscriber data server at one or more of the plurality of stages to verify that the subscriber data is in sync at the first subscriber data server and the second subscriber data server.

In some aspects, the techniques described herein relate to one or more non-transitory computer readable storage media, wherein the method further includes: when it is determined that cutover is to be made to the second subscriber data server, moving live traffic data from the first subscriber data server to the second subscriber data server.

In some aspects, the techniques described herein relate to one or more non-transitory computer readable storage media, wherein the one or more processing tracks include: a communication profile data including a template that determines which wireless communication services are available to a given wireless device of the plurality of wireless devices, and which wireless communication service providers the given wireless device can use when roaming; roaming restriction data that maps wireless communication service providers with respective communication profiles: switchover access point name data for gateways between the wireless network and the Internet to be associated with the second subscriber data server; switchover roaming restriction data that associates the roaming restriction data with the second subscriber data server; and switchover communication profile data that associates the communication profile data with the second subscriber data server.

In some aspects, the techniques described herein relate to a system including: a first subscriber data server that stores subscriber data for each of a plurality of wireless devices, the subscriber data enabling wireless communication services for the plurality of wireless devices in a wireless network; a second subscriber data server; and a controller configured to: determine to migrate the subscriber data from the first subscriber data server to the second subscriber data server; upon determining to migrate the subscriber data, initiate a migration process to migrate the subscriber data from the first subscriber data server to a second subscriber data server by copying the subscriber data from the first subscriber data server to the second subscriber data server; and while copying is occurring and one or more new wireless devices are being provisioned for the wireless communication services in the wireless network, add new subscriber data for the one or more new wireless devices to both the first subscriber data server and to the second subscriber data server.

In some aspects, the techniques described herein relate to a system, wherein the controller is configured to add new subscriber data so as to continue to provision the new subscriber data in both the first subscriber data server and to the second subscriber data server after signaling cutover to the second subscriber data server for a period of time after has occurred until it is determined that there is no need to roll back to the first subscriber data server.

In some aspects, the techniques described herein relate to a system, wherein the migration process includes a plurality of stages, each of which includes one or more processing tracks.

In some aspects, the techniques described herein relate to a system, wherein the controller is configured to: pause the migration process at a particular stage of the plurality of stages upon determining occurrence of an issue that would prevent accurate migration of the subscriber data; and upon resolution of the issue, resume the migration process from the particular stage.

In some aspects, the techniques described herein relate to a system, wherein the controller is further configured to: audit the subscriber data in the first subscriber data server and the second subscriber data server at one or more of the plurality of stages to verify that the subscriber data is in sync at the first subscriber data server and the second subscriber data server.

In some aspects, the techniques described herein relate to a system, wherein the controller is further configured to: when it is determined that cutover is to be made to the second subscriber data server, moving live traffic data from the first subscriber data server to the second subscriber data server.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

storing, in a first subscriber data server, subscriber data for each of a plurality of wireless devices, the subscriber data enabling wireless communication services for the plurality of wireless devices in a wireless network;

determining to migrate the subscriber data from the first subscriber data server to a second subscriber data server;

upon determining to migrate the subscriber data, initiating a migration process to migrate the subscriber data from the first subscriber data server to a second subscriber data server by copying the subscriber data from the first subscriber data server to the second subscriber data server; and provisioning one or more new wireless devices for the wireless communication services in the wireless network; and while copying is occurring during the migration process and while provisioning the one or more new wireless devices for the wireless communication services in the wireless network, adding new subscriber data for the one or more new wireless devices to the first subscriber data server and adding the new subscriber data for the one or more new wireless devices to the second subscriber data server.

2. The method of claim 1, wherein adding comprises continuing to provision the new subscriber data in both the first subscriber data server and to the second subscriber data server after signaling cutover to the second subscriber data server for a period of time after has occurred until it is determined that there is no need to roll back to the first subscriber data server, and wherein the new subscriber data enables wireless communication services for the one or more new wireless devices.

3. The method of claim 1, wherein the migration process comprises a plurality of stages, each of which includes one or more processing tracks.

4. The method of claim 3, further comprising:

pausing the migration process at a particular stage of the plurality of stages upon determining occurrence of an issue that would prevent accurate migration of the subscriber data;

determining when the issue is resolved; and upon determining that the issue is resolved, resuming the migration process from the particular stage.

5. The method of claim 4, further comprising:

auditing the subscriber data in the first subscriber data server and the second subscriber data server at one or more of the plurality of stages to verify that the subscriber data is in sync at the first subscriber data server and the second subscriber data server.

6. The method of claim 3, further comprising:

when it is determined that cutover is to be made to the second subscriber data server, moving live traffic data from the first subscriber data server to the second subscriber data server.

7. The method of claim 3, wherein the one or more processing tracks include:

a communication profile data comprising a template that determines which wireless communication services are available to a given wireless device of the plurality of wireless devices, and which wireless communication service providers the given wireless device can use when roaming;

roaming restriction data that maps wireless communication service providers with respective communication profiles:

switchover access point name data for gateways between the wireless network and the Internet to be associated with the second subscriber data server;

switchover roaming restriction data that associates the roaming restriction data with the second subscriber data server; and switchover communication profile data that associates the communication profile data with the second subscriber data server.

8. One or more non-transitory computer readable storage media encoded with instructions that, when executed by one or more processors, cause the one or more processors to perform a method comprising operations including:

storing, in a first subscriber data server, subscriber data for each of a plurality of wireless devices, the subscriber data enabling wireless communication services for the plurality of wireless devices in a wireless network;

determining to migrate the subscriber data from the first subscriber data server to a second subscriber data server;

upon determining to migrate the subscriber data, initiating a migration process to migrate the subscriber data from the first subscriber data server to a second subscriber data server by copying the subscriber data from the first subscriber data server to the second subscriber data server; and provisioning one or more new wireless devices for the wireless communication services in the wireless network; and while copying is occurring during the migration process and while provisioning the one or more new wireless devices for the wireless communication services in the wireless network, adding new subscriber data for the one or more new wireless devices to the first subscriber data server and adding the new subscriber data for the one or more new wireless devices to the second subscriber data server.

9. The one or more non-transitory computer readable storage media of claim 8, wherein adding comprises continuing to provision the new subscriber data in both the first subscriber data server and to the second subscriber data server after signaling cutover to the second subscriber data server for a period of time after has occurred until it is determined that there is no need to roll back to the first subscriber data server, and wherein the new subscriber data enables wireless communication services for the one or more new wireless devices.

10. The one or more non-transitory computer readable storage media of claim 8, wherein the migration process comprises a plurality of stages, each of which includes one or more processing tracks.

11. The one or more non-transitory computer readable storage media of claim 10, wherein the method further includes operations of:

pausing the migration process at a particular stage of the plurality of stages upon determining occurrence of an issue that would prevent accurate migration of the subscriber data;

determining when the issue is resolved; and upon determining that the issue is resolved, resuming the migration process from the particular stage.

12. The one or more non-transitory computer readable storage media of claim 11, wherein the method further includes:

auditing the subscriber data in the first subscriber data server and the second subscriber data server at one or more of the plurality of stages to verify that the subscriber data is in sync at the first subscriber data server and the second subscriber data server.

13. The one or more non-transitory computer readable storage media of claim 12, wherein the method further includes:

when it is determined that cutover is to be made to the second subscriber data server, moving live traffic data from the first subscriber data server to the second subscriber data server.

14. The one or more non-transitory computer readable storage media of claim 12, wherein the one or more processing tracks include:

a communication profile data comprising a template that determines which wireless communication services are available to a given wireless device of the plurality of wireless devices, and which wireless communication service providers the given wireless device can use when roaming;

roaming restriction data that maps wireless communication service providers with respective communication profiles:

switchover access point name data for gateways between the wireless network and the Internet to be associated with the second subscriber data server;

switchover roaming restriction data that associates the roaming restriction data with the second subscriber data server; and switchover communication profile data that associates the communication profile data with the second subscriber data server.

15. A system comprising:

a first subscriber data server that stores subscriber data for each of a plurality of wireless devices, the subscriber data enabling wireless communication services for the plurality of wireless devices in a wireless network;

a second subscriber data server; and a controller configured to:

determine to migrate the subscriber data from the first subscriber data server to the second subscriber data server;

upon determining to migrate the subscriber data, initiate a migration process to migrate the subscriber data from the first subscriber data server to a second subscriber data server by copying the subscriber data from the first subscriber data server to the second subscriber data server;

provision one or more new wireless devices for the wireless communication services in the wireless network; and while copying is occurring during the migration process and while provisioning the one or more new wireless devices for the wireless communication services in the wireless network, add new subscriber data for the one or more new wireless devices to the first subscriber data server and adding the new subscriber data for the one or more new wireless devices to the second subscriber data server.

16. The system of claim 15, wherein the controller is configured to add the new subscriber data so as to continue to provision the new subscriber data in both the first subscriber data server and to the second subscriber data server after signaling cutover to the second subscriber data server for a period of time after has occurred until it is determined that there is no need to roll back to the first subscriber data server, and wherein the new subscriber data enables wireless communication services for the one or more new wireless devices.

17. The system of claim 15, wherein the migration process comprises a plurality of stages, each of which includes one or more processing tracks.

18. The system of claim 17, wherein the controller is configured to:

pause the migration process at a particular stage of the plurality of stages upon determining occurrence of an issue that would prevent accurate migration of the subscriber data;

determine when the issue is resolved; and upon determining that the issue is resolved, resume the migration process from the particular stage.

19. The system of claim 18, wherein the controller is further configured to:

audit the subscriber data in the first subscriber data server and the second subscriber data server at one or more of the plurality of stages to verify that the subscriber data is in sync at the first subscriber data server and the second subscriber data server.

20. The system of claim 17, wherein the controller is further configured to:

when it is determined that cutover is to be made to the second subscriber data server, moving live traffic data from the first subscriber data server to the second subscriber data server.

21. A computer-implemented method comprising:

storing, in a first subscriber data server, subscriber data for each of a plurality of wireless devices, the subscriber data enabling wireless communication services for the plurality of wireless devices in a wireless network;

determining to migrate the subscriber data from the first subscriber data server to a second subscriber data server;

upon determining to migrate the subscriber data, initiating a migration process to migrate the subscriber data from the first subscriber data server to a second subscriber data server by copying the subscriber data from the first subscriber data server to the second subscriber data server;

provisioning one or more new wireless devices for the wireless communication services in the wireless network; and while copying is occurring during the migration process and while provisioning the one or more new wireless devices for the wireless communication services in the wireless network, adding new subscriber data for the one or more new wireless devices to the first subscriber data server and adding the new subscriber data for the one or more new wireless devices to the second subscriber data server, wherein the migration process comprises at least one state that includes at least one processing track selected from a group including a communication profile data comprising a template that determines which wireless communication services are available to a given wireless device of the plurality of wireless devices, and which wireless communication service providers the given wireless device can use when roaming, roaming restriction data that maps wireless communication service providers with respective communication profiles, switchover access point name data for gateways between the wireless network and the Internet to be associated with the second subscriber data server, switchover roaming restriction data that associates the roaming restriction data with the second subscriber data server, and switchover communication profile data that associates the communication profile data with the second subscriber data server.

* * * * *